United States Patent
Berggren et al.

(10) Patent No.: US 12,035,185 B2
(45) Date of Patent: Jul. 9, 2024

(54) METHODS AND NETWORK DEVICES FOR MOBILITY MANAGEMENT OF UNMANNED AERIAL VEHICLES

(71) Applicant: SONY CORPORATION, Tokyo (JP)

(72) Inventors: Anders Berggren, Lund (SE); Rickard Ljung, Helsingborg (SE); Lars Nord, Lund (SE)

(73) Assignee: Sony Group Corporation, Tokyo (JP)

( * ) Notice: Subject to any disclaimer, the term of this patent is extended or adjusted under 35 U.S.C. 154(b) by 145 days.

(21) Appl. No.: 16/958,315

(22) PCT Filed: Dec. 6, 2018

(86) PCT No.: PCT/SE2018/051256
§ 371 (c)(1),
(2) Date: Jun. 26, 2020

(87) PCT Pub. No.: WO2019/151917
PCT Pub. Date: Aug. 8, 2019

(65) Prior Publication Data
US 2021/0037436 A1 Feb. 4, 2021

(30) Foreign Application Priority Data

Feb. 5, 2018 (SE) .................... 1850129-6

(51) Int. Cl.
*H04W 36/00* (2009.01)
*H04W 36/08* (2009.01)
(52) U.S. Cl.
CPC ..... *H04W 36/00835* (2018.08); *H04W 36/08* (2013.01)
(58) Field of Classification Search
CPC .......... H04W 36/00835; H04W 36/08
(Continued)

(56) References Cited

U.S. PATENT DOCUMENTS 9,537,561 B1  1/2017 Kotecha et al.
2012/0184219 A1* 7/2012 Richardson ........... G01S 5/0278
455/67.11
(Continued)

FOREIGN PATENT DOCUMENTS

CN  102572879 A  7/2012
CN  104144437 A  11/2014
(Continued)

OTHER PUBLICATIONS

International Search Report and Written Opinion from corresponding International Application No. PCT/SE2018/051256, mailed on Dec. 21, 2018, 8 pages.

(Continued)

*Primary Examiner* — Joel Ajayi
(74) *Attorney, Agent, or Firm* — Tucker Ellis LLP

(57) ABSTRACT

The present disclosure relates to the area of mobility management In wireless communication systems, and in particular to methods for managing mobility of a wireless communication device (10) based on a discovery signal transmitted by the wireless communication device (10). According to a first aspect of embodiments it is provided a method, for use in a wireless communication device (10), for supporting mobility. The method comprises determining (S1) whether to transmit a discovery signal configured for use by one or more of the radio network nodes (30, 40) in a wireless communication network (1) for mobility and upon the determining being positive, transmitting (S4) the discovery signal, wherein the discovery signal comprises an identifier of the wireless communication device (10) and an indication that the discovery signal is for use in mobility management.

19 Claims, 9 Drawing Sheets

(58) Field of Classification Search
USPC .................................................. 455/436–448
See application file for complete search history.

(56) References Cited

U.S. PATENT DOCUMENTS

| | | | |
|---|---|---|---|
| 2013/0225168 A1* | 8/2013 | Singh .............. | H04W 36/00837 455/435.1 |
| 2014/0016488 A1* | 1/2014 | Xu ..................... | H04W 52/0206 370/252 |
| 2014/0031028 A1* | 1/2014 | Yamada ................ | H04W 76/14 455/419 |
| 2015/0208332 A1 | 7/2015 | Baghel et al. | |
| 2016/0100355 A1* | 4/2016 | Chen ..................... | H04W 48/16 370/232 |
| 2017/0094693 A1* | 3/2017 | Law ....................... | H04W 40/08 |
| 2017/0215117 A1* | 7/2017 | Kwon .................. | H04B 7/0408 |

FOREIGN PATENT DOCUMENTS

| | | |
|---|---|---|
| EP | 2983387 A1 | 2/2016 |
| GB | 2498395 A | 7/2013 |
| GB | 2506886 A | 4/2014 |
| WO | 2014113976 A1 | 7/2014 |

OTHER PUBLICATIONS

Supplementary European Search Report for European Application No. 18904166, dated Feb. 23, 2021, 8 pages.

Huawei et al.: "Options for Discovery Message Format and Identifiers", 3GGP Draft; R2-134403; 3rd Generation Partnership Project (3GPP); vol. RAN WG2, Meeting 84; R2-134403; dated Nov. 2, 2013; 6 pages.

Huawei et al.: "Solution for Key Issue 2 eRelay-UE Discovery and Selection", 3GGP Draft; 3rd Generation Partnership Project (3GPP); vol. SA WG2, Meeting 118-bis; S2-170245; dated Jan. 16, 2017; 5 pages.

Samsung et al.: "PC5 discovery message format for PS discovery and Relay discovery additional Information"; 3GGP Draft;; 3rd Generation Partnership Project (3GPP); vol. CT WG1, Meeting 95; C1-154392; dated Nov. 16, 2015; 8 pages.

CMCC, "Discussion on uplink measurement based mobility", 3rd Generation Partnership Project (3GPP), Goteborg, Sweden, Aug. 2016, R2-165213, 4 pages.

* cited by examiner

METHODS AND NETWORK DEVICES FOR MOBILITY MANAGEMENT OF UNMANNED AERIAL VEHICLES

TECHNICAL FIELD

The present disclosure relates to the area of mobility management in wireless communication systems, and in particular to methods for managing mobility of unmanned vehicles based on discovery signals transmitted by the unmanned vehicles. The disclosure also relates to a corresponding wireless communication device and network nodes and to a computer program for implementing the proposed method.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD, and Time Division Duplex, TDD, modes. 3GPP is also responsible for standardization of the New Radio (NR), also referred to as a 5G radio technology. In NR the system bandwidth is flexible and similar to LTE it can operate in both FDD and TDD.

In an E-UTRAN, a User Equipment, UE, or a wireless communication device is wirelessly connected to a Radio Base Station, RBS, commonly referred to as a NodeB, in UMTS, and as an evolved NodeB, eNodeB or eNB, in LTE. In NR a base station may also be referred to as gNB. A Radio Base Station, RBS, or an access point, or a transmission and reception point (TRP) is a general term for a radio network node capable of transmitting radio signals to a wireless communication device and receiving signals transmitted by a wireless communication device.

Unmanned Aerial Vehicle (UAV) or drones for professional or leisure applications are used for several missions. During their missions, they might be connected to a remote user or a Mission Application Server to report regularly or by burst mission information that are processed to generate added value products. The Mission information that is reported is often images of the environment that is being flown over. Thus, cellular connectivity will be key for coordinated operation and control of UAVs, more commonly referred to as drones, enabling a growing set of use cases within and beyond the operator's visual line of sight. These aerial vehicles are herein considered to be aerial wireless communication devices or aerial UEs. With this said, it is of course desirable to let aerial vehicles being served by existing network deployments, e.g. LTE or NR, with Base Station antennas targeting terrestrial coverage.

LTE and NR uses downlink reference signals transmitted by the eNBs or gNBs. A user equipment, UE, receiving the reference signal can measure the quality of neighbour cells for mobility management purposes. One challenge for aerial UE's related to mobility management mainly depends on the increased height above ground, since the higher height typically increases the number of detected neighbour cells significantly. Since once aerial (i.e. flying or air born) the UE would mainly have Line of Sight, LOS, to the eNodeB(s), which provides good signal conditions (minimum amount of reflections or obstacles blocking the connection) for the radio network nodes, see FIG. 1. FIG. 1 illustrates a wireless communication network where two air borne UEs 10, here individually denoted 10a and 10b, have LOS to more cells than the terrestrial UE 10c. As can be seen in FIG. 1 the number of cells increases with height H1, H2.

There is also a challenge with respect to when an aerial UE is moving at high speed, since that reduces the time available to conduct a handover and therefore puts significant burden on aerial UEs to conduct the multiple neighbour cell measurements during a limited period of time.

As the number of detectable cells and the range of the detected cells increases with height, the aerial UEs are also subject to a more significant interference from the neighbouring cells when operating on higher altitudes, which in turn may affect the measurement time per cell and therefore impacts the mobility robustness. Also, as the detectable cells (frequencies) depend on the aerial UE's location/height, it may be hard for the Base station to configure the aerial UE with an appropriate list of "frequencies" to measure on. In addition, there may also be a need to identify aerial UEs that does not have proper certification for connecting to the cellular network while flying.

Hence, there is a need for enhancements in terms of mobility management as well as robustness in mobility management signalling for aerial UEs.

SUMMARY

An object of embodiments herein is to improve handover efficiency in the network, and to introduce an identification method for UEs such as e.g. aerial wireless communication devices by introducing mobility measurements based on discovery signals.

According to a first aspect of embodiments herein it is provided a method, for use in a wireless communication device, for supporting mobility management of the wireless communication device in a wireless communication network comprising a plurality of radio network nodes, wherein one of the plurality of radio network nodes is a serving radio network node of the wireless communication device. The method comprises determining whether to transmit a discovery signal configured for use by one or more of the radio network nodes in the wireless communication network for mobility management of the wireless communication device; and upon the determining being positive, transmitting the discovery signal, wherein the discovery signal comprises an identifier of the wireless communication device and an indication that the discovery signal is for use in mobility management.

The use of discovery signals, or announcement signals, for mobility management purposes will lead to improved mobility management suitable for aerial wireless communication devices. It will also make it possible for the wireless communication network to detect aerial communication devices and perform uplink measurements without any preceding neighbouring cell/frequency list configuration signalling.

According to some embodiments, the discovery signal further comprises an identifier of the radio network node serving the wireless communication device. Thus a neighbouring radio network node may identify the signal and report it to the corresponding serving radio network node without any previous request from the serving radio network node.

According to some embodiments, the discovery signal is transmitted on radio resources that are also used for transmission of signals for use by functions other than mobility management. Thus, the proposed solution does not require that dedicated resources are allocated (e.g. once the UE becomes airborne), but may reuse already allocated uplink resources such as the resource pool allocated for sidelink discovery signalling.

According to some embodiments, the discovery signal is transmitted on radio resources that are also used by the wireless communication device for transmission of device to device, D2D, discovery signals. By simply modifying an already existing signal the implementation is simplified. The modification can be made in various ways e.g. a new message type may be introduced (8 bits reserved), spare bits may be used or this indication may be added in the announcer info field.

According to some embodiments, the determining comprises evaluating one or more criteria taking a mobility status such as an aerial status of the wireless communication device as input. Hence, the mobility status may trigger the transmission of the discovery signal.

According to a second aspect of embodiments herein it is provided a corresponding method, for use in a radio network node in a wireless communication network comprising a plurality of network nodes, for supporting mobility management. The method comprises monitoring radio resources for discovery signals and upon identifying, a discovery signal comprising an indication that the discovery signal is for use in mobility management, reporting mobility data associated with the discovery signal to one or more of the other radio network nodes.

By using a discovery signal comprising an indication that the discovery signal is for use in mobility management no dedicated resources are needed. The mere presence of the discovery signal may trigger receiving radio network nodes to take appropriate actions.

According to some embodiments, the mobility data comprises identity data defining wireless communication devices identified by the detected discovery signals. Thereby, the node implementing the mobility function may be informed about which radio network nodes are candidate targets for a handover.

According to some embodiments, the mobility data comprises measurement data corresponding to the detected discovery signals. The discovery signals may then replace traditional reference signals for the purpose of estimating e.g. channel properties and/or signal strength.

According to some embodiments, the mobility data comprises measurement data corresponding to the detected discovery signals that fulfil a predefined criteria. The criteria may be related to meeting a threshold value of one measurement data parameter, or a combination of threshold values for multiple measurement data parameters. By only reporting the discovery of wireless communication devices e.g. only when received signal strength is sufficient, it is ensured that signalling is minimized.

According to some embodiments, the mobility data comprises information identifying a wireless communication device that transmitted the discovery signal and/or a serving network node of the wireless communication device. Thus, the radio network node, may be based on only data included in the discovery signal, identify the serving network node and report relevant measurements concerning a discovered wireless communication device. No prior signalling is required.

According to some embodiments, the method comprises sending, to the serving radio network node a request asking the serving radio network node whether to report mobility data associated with the wireless communication device and receiving, from the serving radio network node, a response acknowledging the request. This additional signalling lets the serving network node control which mobility data to receive.

According to some embodiments, the wireless communication network comprises a plurality of other radio network nodes. Then the method further comprises sending, to one or more of the radio network nodes a request asking them whether to report mobility data associated with the wireless communication device. In principle, the discovery data may be made available to all radio network nodes in the wireless communication network.

According to a third aspect of embodiments herein it is provided a method for use in a serving radio network node of a wireless communication device in a wireless communication network, wherein the wireless communication network comprises a plurality of radio network nodes, for managing mobility of the wireless communication device in the wireless communication network. The method comprises receiving, from one or more of the network nodes, mobility data associated with measurements performed on a discovery signal transmitted by the wireless communication device; and performing mobility management of the wireless communication device based on the received mobility data.

According to some embodiments, performing the mobility management comprises selecting a target network node from the one or more radio network nodes based on the received mobility data; and handing over the wireless communication device from the serving radio network node to the selected target radio network node.

According to some embodiments, the method further comprises determining a mobility status such as for example an aerial status or a high velocity status of the wireless communication device and sending, based on the mobility status, a message to the wireless communication device comprising information associated with the transmission of the discovery signal.

According to some embodiments, the information comprises an instruction to the wireless communication device to transmit the discovery signal. According to some embodiments, the information comprises one or more criteria to be used by the wireless communication device when determining whether to transmit the discovery signal.

According to some embodiments, the information comprises information defining a repetition period and/or radio resource information to use when transmitting the discovery signal.

According to some embodiments, the method further comprises determining aerial mobility status of the wireless communication device and sending, based on the mobility status, to one or more of the radio network nodes, a message comprising information associated with measurements to be performed by the radio network node on a discovery signal.

According to a fourth aspect of embodiments herein it is provided a wireless communication device configured to operate in a wireless communication network being configured to perform all aspects of the method for use in a wireless communication device described herein.

According to a fifth aspect of embodiments herein it is provided a radio network configured to support mobility management and to perform all aspects of the method for use in a target radio network node described herein.

According to a sixth aspect of embodiments herein it is provided a serving network node configured to perform all aspects of the method for use in a serving network node described herein.

According to a seventh aspect of embodiments herein it is provided a computer program comprising instructions which, when the program is executed, cause the wireless communication device or network node to carry out the method as described herein.

According to an eighth aspect of embodiments herein it is provided a computer-readable medium storing the computer program.

DETAILED DESCRIPTION

Figure 1:
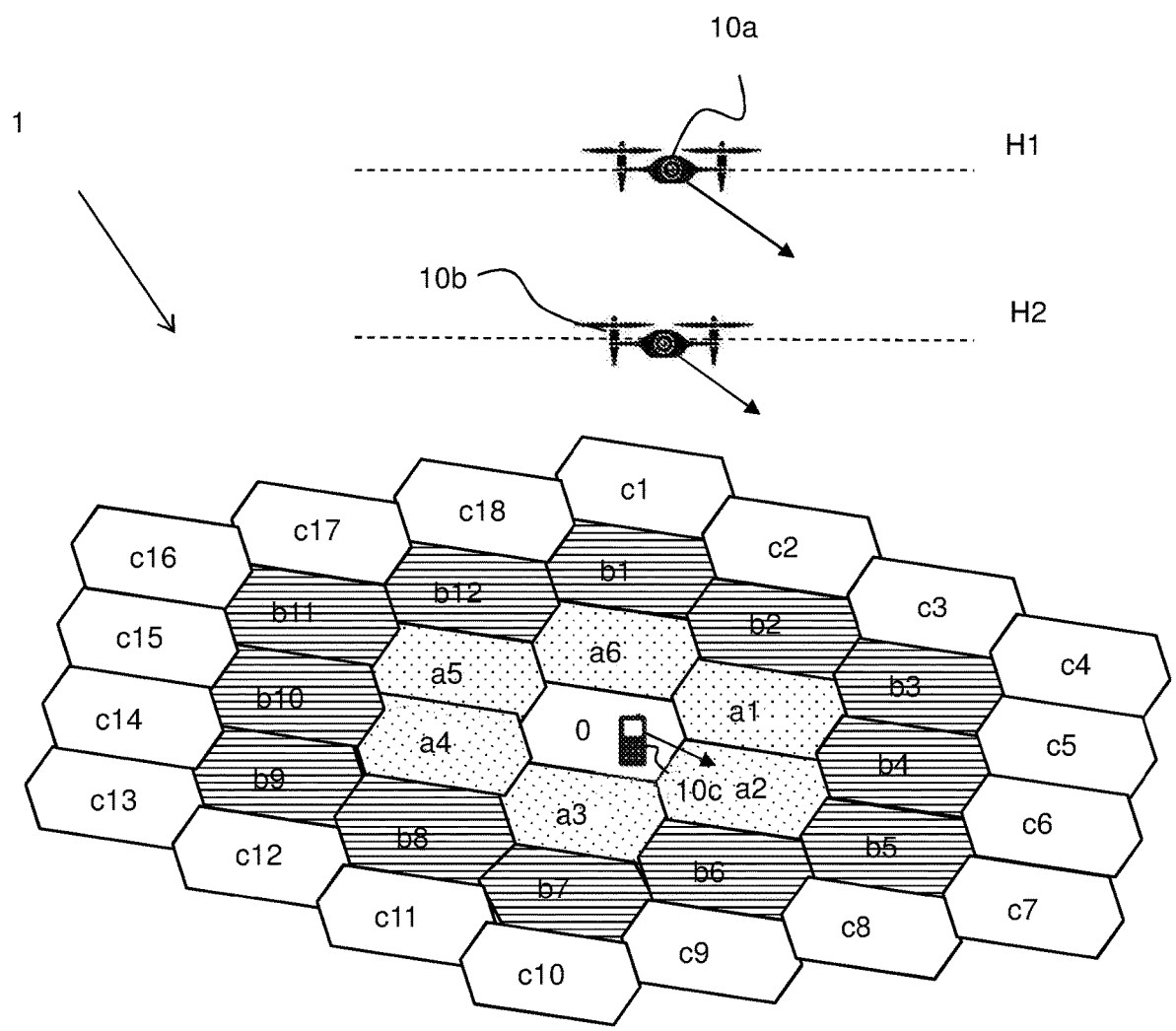
FIG. 1 illustrates a wireless communication network where an aerial UE observes more neighbour cells than a terrestrial UE.

To provide ubiquitous coverage, it is essential to ensure that users in a wireless communication network are able to access the service as they move across the network coverage area. While radio communication systems such as LTE, the radio interface is optimized to support low-to-medium mobility scenarios, it can also support very high-speed users.

The solution is herein presented with reference to an Unmanned Aerial Vehicle, UAV in LTE, but it must be appreciated that it may also be used for other wireless communication devices and systems.

In LTE, a UE may be in idle or connected mode, with respect to the network. An idle UE has no dedicated signalling or data bearers associated with it. In other words, no network/radio resources are specifically allocated to it. An idle UE's location is known to the network only within a contiguous groups of cells, called tracking area. While an idle UE is not attached to any eNodeB, it is required to select a suitable cell and camp on it. The procedure of an idle UE selecting and camping on a cell is known as Cell Selection. An idle UE, while camping on a cell, continues to regularly monitor the signal quality of the camped cell. In case a quality level criteria is met, (e.g. the signal quality is lower than a threshold), the UE may monitor other cells and may decide to camp on another cell if radio conditions indicates a benefit to do so, for example, due to UE mobility. This process is known as Cell Reselection. The criteria to be adopted by an idle UE for selecting/reselecting a cell are communicated to the UE via the system information broadcast messages periodically by each cell.

While in connected state, a UE may need to switch to another eNodeB because of the degradation in the received signal power from the serving eNodeB, which may happen due to user mobility. The process of a connected mode UE changing its association from one eNodeB (source/serving radio network node) to another (target radio network node) is referred to as HandOver (HO). In LTE, the HO process is controlled by the eNodeB. Mobility management refers to determining an appropriate cell for camping and an appropriate eNodeB for association, for an idle and connected mode UE, respectively, performing the required signalling exchange, and ensuring minimal delay while avoiding unnecessary cell changes.

Embodiments herein describe solutions to the above mentioned problems related to mobility management for aerial UEs by introducing a trigger based uplink mobility measurement solution, which is based on a discovery signal transmitted by UEs, in particular by aerial UEs. A discovery signal herein refers to an unscheduled discovery announcement message. In other words, the discovery signal is typically an unscheduled signal transmitted on radio resources that are also used by other wireless communication devices and possibly also for different types of discovery or sidelink transmissions/signals. A resource pool to use for transmission of discovery signals is typically allocated by the network. The discovery signal comprises information that enables the receiver to detect its purpose and basic information as e.g. the identity of the sender. The discovery signal for use in mobility management may also comprise other mobility related information.

When using the proposed method uplink based measurements for mobility the network needs to configure some sort of uplink discovery signal that the aerial UE would transmit with certain configuration, and also configure neighbour radio network nodes to listen to.

Figure 2:
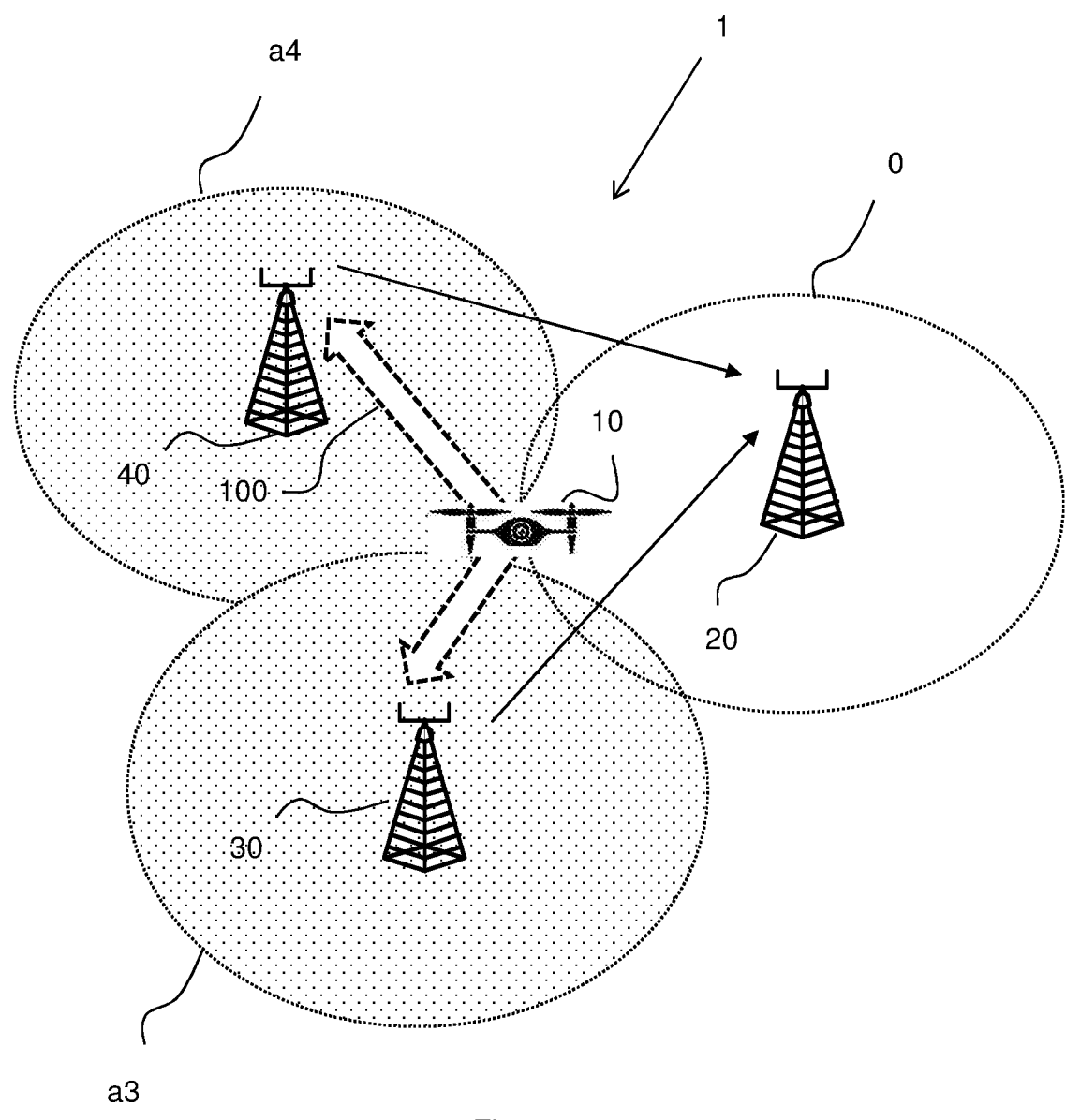
FIG. 2 illustrates a parts of a wireless communication network.

Embodiments herein may be implemented in one or more wireless communication networks. FIG. 2 depicts parts of such a wireless communications network 1, e.g. the network of FIG. 1. The wireless communications network 1 is for example a 5G, LTE, UMTS, GSM, any 3GPP wireless communications network, or any cellular wireless communications network or system.

The wireless communications network 1 comprises a plurality of radio network nodes 20, 30, 40. For simplicity only three radio network nodes are illustrated in FIG. 2. However, it must be appreciated that in reality the number of radio network nodes is typically much higher. Each radio network node serves a corresponding cell 0, a3, a4.

The term "radio network node" may correspond to any type of radio network node. For example, the radio network nodes 20, 30, 40 may be a base station, such as a gNB or eNB. The base station may also be referred to as a NodeB, an evolved Node B (eNB, eNode B), a base transceiver station (BTS), Access Point (AP) Base Station, Wi-Fi AP, base station router, or any other network unit capable of communicating with a wireless communications device within a cell served by the base station depending e.g. on the radio access technology and terminology used. The radio network nodes 20, 30, 40 are connected to the core network of the wireless communication via the backhaul.

The network nodes 20, 30, 40 may communicate with a wireless communications device 10, in LTE referred to as a UE.

The wireless communications device 10 is here an unmanned aerial vehicle, UAV. However, the methods may also be used for e.g. a mobile terminal or a wireless terminal, a mobile phone, a computer such as e.g. a laptop, a Personal Digital Assistants (PDAs) or a tablet computer, with wireless capability, target device, device to device UE, MTC UE or UE capable of machine to machine communication, iPAD, mobile terminals, smart phone, Laptop Embedded Equipment (LEE), Laptop Mounted Equipment (LME), USB dongles etc. or any other radio network units capable to communicate over a radio link in a wireless communications network.

One of the plurality of radio network nodes 20, 30, 40 is a serving radio network node 20 of the wireless communication device 10. In LTE the wireless communications device 10 is continuously performing measurements on neighbour network nodes in order to identify potential target radio network nodes 30, 40 that the wireless communications device 10 can be handed over to.

Below, the proposed technique will be illustrated in more detail by a number of exemplary embodiments. The following embodiments will be described referring to the example wireless communication network 1 of FIG. 2. However, it must be appreciated that the methods may be implemented in other networks as well.

It should be noted that these embodiments are not mutually exclusive. Components from one embodiment may be tacitly assumed to be present in another embodiment and it will be obvious to a person skilled in the art how those components may be used in the other exemplary embodiments.

The disclosure is based on the idea to in addition to, or in some cases possibly instead of the legacy downlink based UE measurements, the network performs additional measurements related to UE mobility. Measurements on uplink reference signals have already been discussed in connection with New Radio, NR, solutions for 5G, in order to achieve increased reliability is e.g. in form of a closed-loop handshake at each connected mode DRX wakeup occasion (i.e., UE transmitting a reference signal and network sending back a response signal), providing them both with more accurate and timely information on channel state. However, in addition to previous discussions, this disclosure proposes uplink measurements on discovery signals, and in particular for aerial UEs.

One possible implementation of this proposal is to reuse the LTE sidelink concept of device discovery/positioning as specified in Vehicle o everything, V2x, technology 3GPP Technical Specification, TS, 23.285 v14.5.0. V2X communication is the passing of information from a vehicle to any entity that may affect the vehicle, and vice versa. In V2x of LTE Release 14 allows vehicles to send basic safety messages which basically means "Here am I" and in some cases includes information such as location, heading, and speed. A V2X message is a D2D message, sent in the uplink frequency band and in D2D case denoted as a sidelink communication using one-to-many communication procedures described in 3GPP TS 23.303 v15.0.0 and TS 36.331. As the V2X message is a transmission in the uplink frequency band, this message could also be received by the eNodeB(s) to identify the UE and estimate the uplink radio channel (similar to the functionality achieved for serving cell by the use of uplink Sounding Reference Signal). The eNodeB(s) might even use the signal to estimate the location of the aerial UEs using Uplink-Time Difference of Arrival, UTDOA. This would possibly also allow the network to detect whether the UE is air born at high altitude or not, as once air born the UE would mainly have Line of Sight, LOS, to the eNodeB(s), providing good signal conditions (minimum amount of reflections) for the radio network nodes.

In other words, based on the existing sidelink concept for broadcasting V2V/discovery messages in LTE, it is herein proposed that radio network nodes could use this type of transmissions for mobility measurements. As mentioned above, V2X communication (as described in TS 23.285) uses vehicle messages (defined by the Society of Automotive Engineers, SAE, Dedicated Short Range Communications, DSRC, (J2735-20092) Message Set Dictionary) transmitted on sidelink user plane resources and one-to many communication as described in TS 23.303. It is herein proposed to use the discovery signals e.g. the discovery announcement message, for the purpose of determining appropriate target radio network nodes (e.g. handover candidates) of a wireless communication device. The radio network nodes detecting the discovery signals could be able to send mobility information e.g. to the serving radio network nodes of the wireless communication device or to any other network node implementing mobility management functionality. It should be appreciated that a message with same or similar format as the discovery message could also be sent as a V2V message using the sidelink user plane resources. For simplicity, we also refer to this message as a discovery signal.

Figure 3:
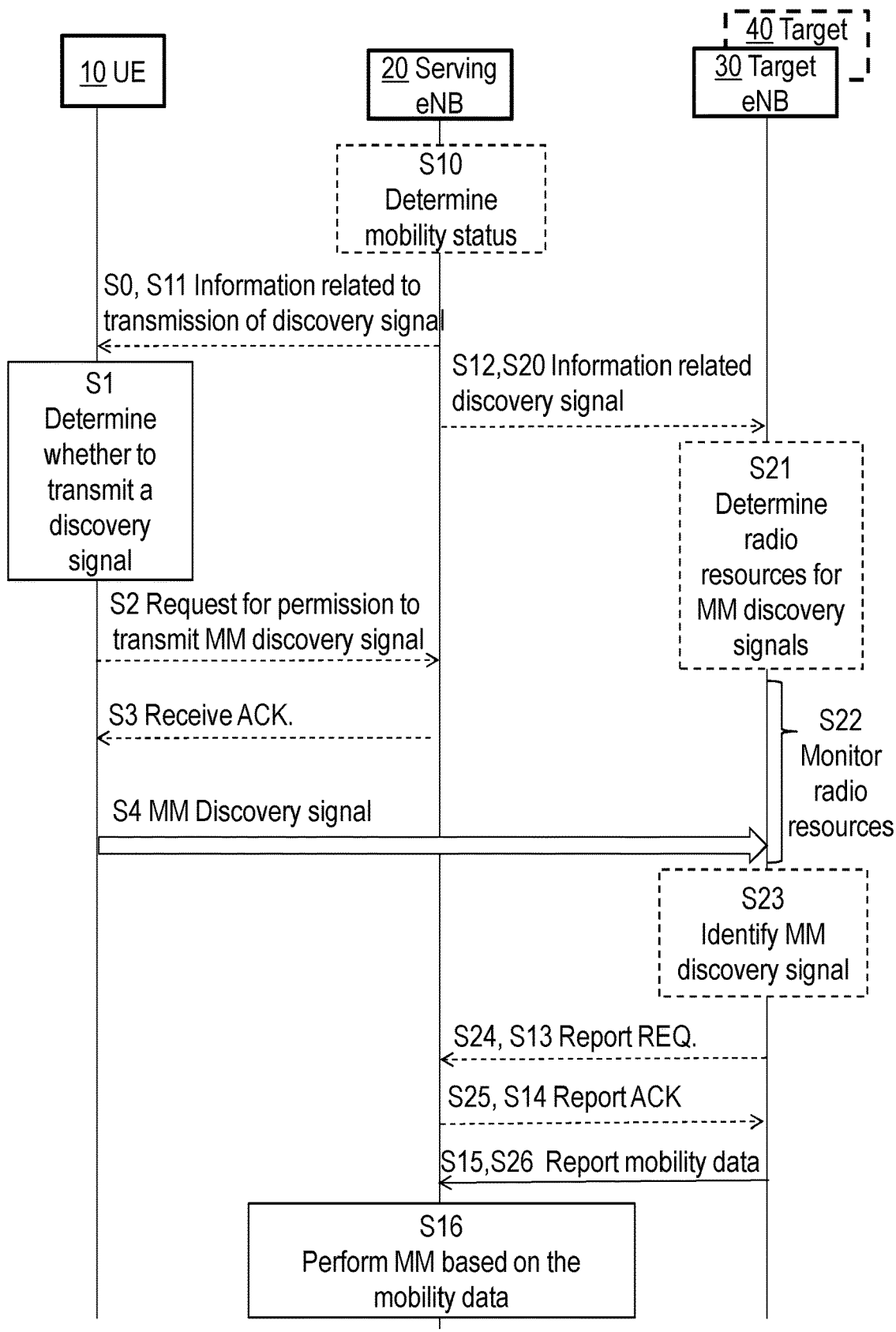
FIG. 3 is a signalling diagram associated with mobility management according to various example embodiments.

Embodiments will firstly be described by describing the interactions of the wireless communications device 10 with the serving network node 20 and a network node 30 of FIG. 2 with reference to a combined signalling diagram and flow chart illustrated in FIG. 3. Note that the same process would typically be performed by radio network node 40 (which is indicated by the dashed target network node 40). Then the method steps performed by the wireless communications device 10, the serving network node 20 and target network node 30 will be described separately in more detail with reference to FIG. 4-6.

It should be appreciated that FIG. 3-6 comprise some operations which are illustrated with a solid border and some operations which are illustrated with a dashed border. The operations which are comprised in a solid border are operations which are comprised in the broader example embodiment. The operations which are comprised in a dashed border are example embodiments which may be comprised in, or a part of, or are further operations which may be taken in addition to the operations of the solid border example embodiments. It should be appreciated that the operations need not be performed in order. Furthermore, it should be appreciated that not all of the operations need to be performed. The example operations may be performed in any suitable order and in any combination.

The proposed technique will now be described referring to the operations performed in the wireless communication device 10, the serving radio network node 20 and radio network node 30, which is a candidate target radio network node for the wireless communication device 10 in an upcoming handover. These operations are typically performed during normal operation (in connected mode), when the wireless communication device 10 is moving in the network.

The use of the proposed discovery signals to be transmitted by wireless communication devices for improved mobility management is typically controlled by the mobility function of the wireless communication network 1. The mobility function is for example implemented in the serving radio network node 20, but it may as well be distributed to other radio network nodes. Either explicit activation by network signalling can be considered (e.g. ARC control), but also an activation of the discovery signal and uplink based measurements based on predefined trigger parameters in the wireless communication device 10 is possible.

The activation of the discovery signal may be based on various parameters, such as certain channel conditions. Example of such conditions could be that the wireless communication device 10 is reporting a high number of detected neighbouring cells, or that the interference level is higher than a certain threshold.

Yet another criteria for activation of the discovery signals could be a mobility status such as an aerial status of the wireless communication device 10. Thus, in some embodiments the serving radio network node 20 determines S10 a mobility status of the wireless communication device 10. For example, in the case of determining an aerial status, the serving radio network node 20 determines if the wireless communication device 10 is flying or not. This determination is e.g. made based on information received from the wireless communication device 10.

Thus, the decision whether to transmit the discovery signal or not is e.g. based on a mobility status, such as the aerial status of the wireless communication device. In some embodiments the decision is made in the network and an explicit instruction is signalled to the wireless communication device 10. The wireless communication network 1 may also or in addition provide information to the wireless communication device 10 for use when determining whether to transmit the discovery signal. Thus, according some embodiments, the serving radio network node 20 sends S11, based on the determined mobility status or other network parameters, a message to the wireless communication device 10 comprising information associated with the transmission of the discovery signal. The wireless communication device 10 receives S0 the message comprising information associated with the transmission of the discovery signal. The information will be used by the wireless communication device 10 to determine whether to transmit the discovery signal. The wireless communication device 10 will normally do as instructed by the network.

However, even though the use of the proposed discovery signals to be transmitted by wireless communication devices for improved mobility management is typically controlled by the mobility function of the wireless communication network 1 the wireless communication device 10 typically makes the final decision regarding whether to transmit the discovery signal or not. In other words, the wireless communication device 10 determines S1 whether to transmit the discovery signal configured for use by one or more of the radio network nodes 30, 40 in the wireless communication network for mobility management of the wireless communication device. If the wireless communication device 10 has received information associated with the transmission of the discovery signal, this information is in general used in the determining S1. The information associated with the transmission of the discovery signal may either be an explicit instruction to activate the discovery signal for use in mobility management. Alternatively, the information may comprise one or more criteria (i.e. rules) or other input that the wireless communication device may use to determine whether to activate the discovery signal or not. This will be described in further detail in connection with FIG. 4 and FIG. 6.

In some scenarios it may be desirable to make the wireless communication network 1 aware of the intention to transmit the discovery signal beforehand. Thus, in some embodiments, wireless communication device 10 may in addition ask the wireless communication device for permission to transmit the discovery signal. This might be relevant if the trigger for transmitting the discovery signal is a default trigger that is activated when predetermined criteria is fulfilled in the wireless communication device 10, e.g. that the aerial UE is flying. Then the wireless communication device 10 sends S2, to its serving radio network node 20, a request for permission to transmit the discovery signal and receives S3 an acknowledgement of the request. The wireless communication device 10 would then typically only proceed to the next step and transmit the discovery signal if allowed. Alternatively the permission/authorisation to send the discovery signal can be handled on NAS (Non-Access Stratum) level when the wireless communication device 10 register to the network or re-register due to mobility or periodic timer expiry by sending a Tracking Area Update, TAU. The eNB can be updated with the by the MME when the eNB is setting up the UE context in the eNB.

If the determining of step S1 is positive i.e. if it is determined that a discovery signal shall be transmitted, then the wireless communication device 10 transmits S4, the discovery signal. The discovery signal 100 is illustrated by the thick arrows in FIG. 2. The transmitting S4 may, as will be explained in further detail in connection with FIG. 4 comprise one single transmission or several repetitions.

In some embodiments the discovery signal is transmitted on radio resources that are also used for transmission of signals for use by other functions than mobility management. For example, the monitored radio resources are also used for transmission of Device-to-Device, D2D, discovery signals or user plane communication. Thus, the discovery signal needs to be configured such that it can be identified by a receiving device. Consequently, the discovery signal comprises an identifier of the wireless communication device 10 and an indication that the discovery signal is for use in mobility management. The indication is for example an information element e.g. in the announcer info field, a flag comprised in the discovery signal e.g. use spare bits or a pre-defined format of the discovery signal e.g. new message type. The indication enables a receiving device to know that the discovery signal shall be used for mobility management.

The purpose of the discovery signal is to facilitate Mobility Management, MM, of the wireless communication device 10. The discovery signal is typically received by multiple candidate target radio network nodes 30, 40 of the wireless communication network (FIG. 2). However, for simplicity FIG. 3 only illustrates the signalling between the wireless communication device 10, the serving eNB 20 and one other network node 30, which is a candidate target for an upcoming handover. The same or corresponding signalling would typically also take place with regard to network node 40. In principle it may be received by any of the radio network nodes 20, 30, 40 of the wireless communication network 1 when channel conditions allows it.

The radio network node 30 may previously have been informed that discovery signal by the serving network node 20. In other words, in some embodiments the serving network node 20 sends S12, to one or more radio network nodes 30, a message comprising information associated with a discovery signal for use in mobility management and consequently the radio network node 30 receives S20 the message comprising information associated with discovery signal transmitted by the wireless communication device 10. The one or more radio network nodes are typically neighbours of the serving network node, which are candidate targets for a future handover. The information e.g. comprises information needed to monitor and detect the discovery signal or information regarding what kind of report the serving network node 20 wants.

As mentioned above the proposed discovery signals are announcements. Thus, the radio network nodes 30 monitors S22 radio resources for the discovery signals. In some scenarios target radio network node 30 does not get any previous indication of information about the discovery signal. Of course the target radio network node 30 needs to know, which radio resources to monitor for this type of signals. However, this information may be fix or configured at system setup.

As mentioned above the monitored radio resources may also be used for transmission of signals for use by other functions than mobility management, such as for transmission of Device-to-Device, D2D, discovery signals or user plane communication. In some embodiments the monitoring S22 also comprises monitoring the determined radio resources for other signals.

The radio network node 30 may also have been informed beforehand that discovery signals for use in mobility management are transmitted in the wireless communication network 1 and which resources will be used for such transmissions. In some embodiments, the radio network node 30 determines S21 which radio resources are used by wireless communication devices 10 when transmitting discovery signals for use in mobility management and then the monitoring S22 comprises monitoring S22 the determined radio resources. The determining e.g. comprises reading the information received S20 from the network or obtaining information stored in the radio network node 30.

When a receiving radio network node detects data (typically a signal level above a certain threshold) on the radio sources used for discovery signals, it interprets the signal to determine what type of signal it is. As explained above, the discovery signal is configured to be received by one or more of the plurality of network nodes of the wireless communication network 1.

When the radio network node 30 identifies S23 a discovery signal for use in mobility management, it informs the wireless communication network 1 accordingly. In other words, upon identifying S23, a discovery signal comprising an indication that the discovery signal is for use in mobility management, the radio network node 30 reports S26 mobility data associated with the discovery signal to one or more of the other radio network nodes 20 in the communication network 1. For example it reports the reception to the serving radio network node 20. The identity of the serving radio network node 20 of the wireless communication device 10 is e.g. obtained from information comprised in the discovery signal as will be further described in connection with FIG. 4. Alternatively enabling identification of the serving radio network node 20 may also have been communicated to the wireless communication device 10 beforehand.

The mobility data comprises e.g. identity data defining wireless communication devices identified by the detected discovery signals or measurement data corresponding to the detected discovery signals that fulfil a predefined criteria.

In some cases it might be desirable not to report all detected discovery signals. Instead, the radio network node 30 may ask the serving network node 20 if it wants to receive a report associated with the detected discovery signal. In other words, in some embodiments, the radio network node 30 sends S24, to the serving radio network node 20, a request asking the serving radio network node 20 whether to report mobility data associated with the wireless communication device 10. The radio network node 20 receives S13 the message and sends S14 a response acknowledging the request to the radio network node 30. The radio network node 30 receives S25 the response from the serving radio network node 30 and reports mobility data accordingly. Alternatively, the radio network node 30 is pre-configured with rules when to report in message S16 sent by radio network node 20.

According to some alternative embodiments not shown in FIG. 3, the serving radio network node may send a request to one or more of its neighbours requesting them to report mobility data associated with a discovery signal transmitted by the wireless communication device 10. In response it will then receive, from the neighbouring radio network nodes, a response acknowledging the request. This additional signalling lets the serving network node control which mobility data to receive.

The serving network node 20 receives S15 the mobility data, sent S26 from one or more of the other network nodes in the wireless communication network 10. The mobility data may, as discussed above, be sent S26 repeatedly or when certain criteria are fulfilled. The mobility data may typically be used in the serving network node when performing S16 mobility management e.g. for handover decisions and/or selecting target radio network node etc. For example, the mobility function in the serving network node 20 uses the mobility data to compare channel conditions between the wireless communication device 10 and the radio network nodes in the wireless communication network 1. In this comparison the serving network node may compare measurements performed on the discovery signal by other radio network nodes with its own measurements.

Figure 4:
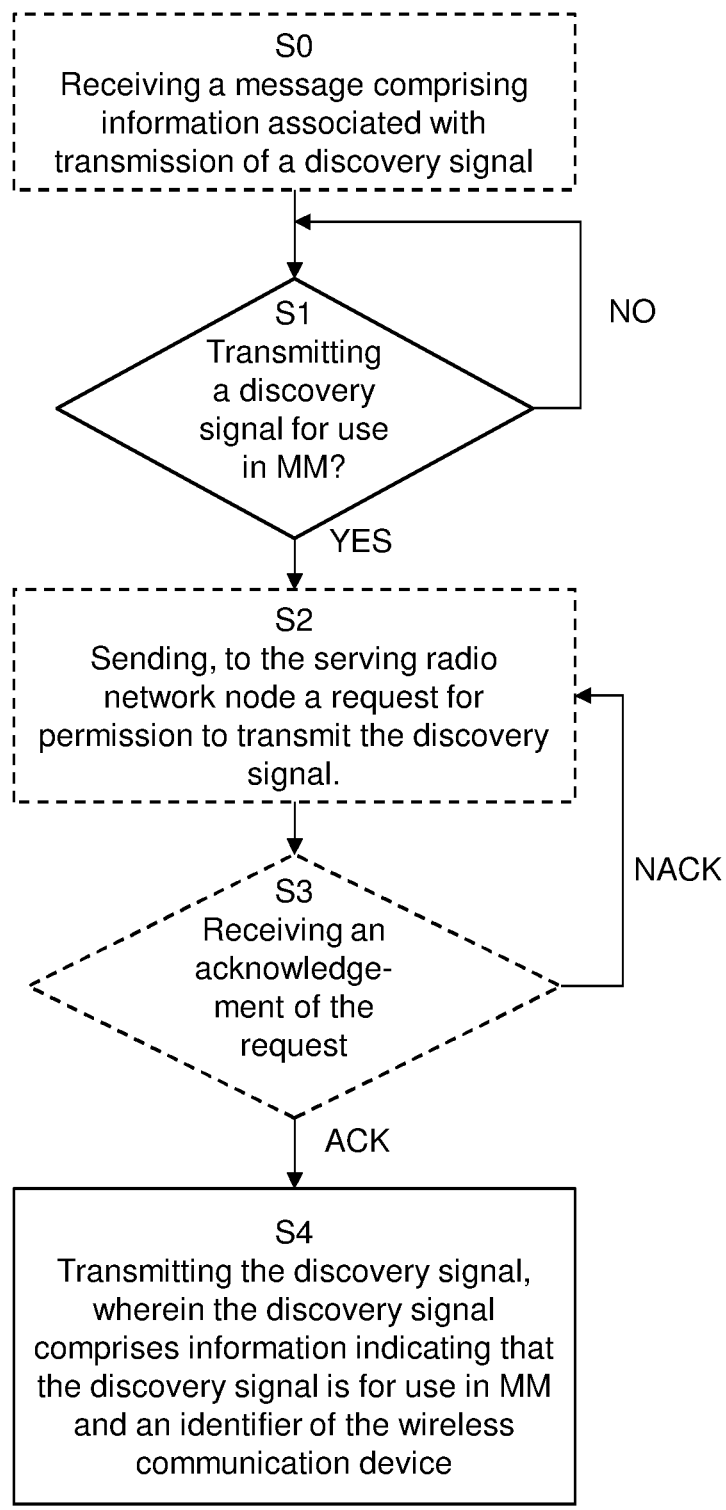
FIG. 4 illustrates the proposed method for use in a wireless communication device.

Embodiments related to the wireless communications device 10 will now follow. FIG. 4 illustrates a flow chart with method steps performed by wireless communication device 10, for supporting mobility management of the wireless communication device 10 in a wireless communication network 1.

The steps of the method may be defined in a computer program, comprising instructions which, when the program is executed by one or more processors causes the wireless communication device 10 to carry out the method. The steps of the method may also be defined in a computer-readable medium. The computer-readable medium comprises instructions that, when executed by a one or more processors, causes the wireless communication device 10 to carry out the method.

The method comprises determining S1 whether to transmit a discovery signal configured for use by one or more of the radio network nodes in the wireless communication network for mobility management of the wireless communication device.

In some embodiments the determining S1 comprises evaluating one or more criteria. A criteria is a pre-determined rules taking one or more parameters as input. One example of a criteria for activation of the discovery signal, could be a default activation as soon as the wireless communication device 10 enters "Aerial mode", or if the wireless communication device 10 height or speed is above a predefined or signalled threshold, or if other movement pattern of the wireless communication device 10 is discovered. In other words, examples of parameters that the criteria could take as input are, a speed of the wireless communication device 10 and an aerial status of the wireless communication device 10.

In another example embodiment the activation could be done by default in case of the number of active cell changes (handovers) performed over a given period of time is higher than a predefined value. In such cases of a default activation the periodicity may be lower as compared to at a trigger based transmission.

Another example of a condition that might trigger the activation of the discovery signal could be that the wireless communication device 10 is reporting a high number of detected neighbour cells, or that the interference level is higher than a certain threshold. In other words, examples of parameters that the criteria could take as input are the number of candidate target radio network nodes 30, 40.

In some embodiments the one or more criteria takes a mobility status of the wireless communication device as input. The wireless communication device 10 may for example always transmit the discovery signal when in an aerial mode.

The one or more criteria may also take other parameters as input, e.g. the number of radio network nodes being candidate target radio network nodes of the wireless communication device 10 or the speed of the wireless communication device.

The determining may also be based on signalling e.g. received from the serving network node 20 of the wireless communication device 10. Thus, in some embodiments, the method further comprises receiving S0, from the serving radio network node 20 of the wireless communication device 10, a message comprising information associated with the transmission of the discovery signal and then the determining S1 is based on at least a part of the received information.

The signalled information may be an explicit instruction to the wireless communication device to transmit the discovery signal. Alternatively the signalled information is one or more criteria to be used by the wireless communication device when determining whether to transmit the discovery signal or parameters to be used when determining S1 whether to transmit the discovery signal.

The discovery signal can be configured to be transmitted once, e.g. upon receiving the activation request by the network. It may also be configured to be transmitted periodically, with either a predefined (e.g. in standard or at network setup) or network configured periodicity. In some embodiments the received information associated with the transmission of the discovery signal defines a repetition period and/or radio resources to use when transmitting the discovery signal.

In conclusion, if the wireless communication device 10 has received S0 information associated with the transmission of the discovery signal, then the determining S1 is based on at least a part of the received information.

If the determining is negative (i.e. the discovery signal is not ("NO") for use in mobility management) then no action is taken by the mobility function, i.e. the function implementing mobility management in the wireless communication network 1. Of course actions my then be taken by other functions or nodes in the wireless communication network 1.

However, upon the determining S1 being positive (i.e. the discovery signal is ("YES") for use in mobility management) then the method comprises transmitting S4 the discovery signal. The transmitted discovery signal comprises an identifier of the wireless communication device 10 and an indication that the discovery signal is for use in mobility management. The indication is for example an information element e.g. in the announcer info field, a flag e.g. use spare bits comprised in the discovery signal, and a pre-defined format e.g. new message type of the discovery signal. This could for example be implemented as an additional signalling bit in the discovery signal, which can be set to 1 or 0 acting as the indicator flag. By transmitting the discovery signal, the wireless communication device 10 announces its presence and enables receiving network nodes to estimate channel conditions to the wireless communication device 10. The discovery signal is typically transmitted on radio resources that are also used for transmission of signals for use by functions other than mobility management, such as on radio resources that are also is used by the wireless communication device 10 for transmission of device to device, D2D, discovery signals or user plane communication.

Unlike normal uplink pilots (SRS) for UTDOA and compared to the existing V2X message, the new discovery signal may typically include information about the serving cell, since the radio network node in the serving cell would typically be the aggregation point for future handover decisions. Additionally, some sort of Identity of the aerial UE would be needed. The network could provide information about the cell and UE ID to use, since that could typically be a temporary ID to be used. Further, the signal could also be updated to contain information related to UEs mobility, e.g. aerial or not, the estimated height above ground, or an estimated speed of the UE. In other words, in some embodiments, the discovery signal further comprises an identifier of the serving radio network node 20 of the wireless communication device 10 and/or other mobility related information.

If there are many wireless communication devices in the wireless communication network 1 that start transmitting discovery signals simultaneously on shared resources interference problems may occur. Thus, it might be desirable to never let the wireless communication device 10 activate its discovery signal without permission from the network. This might be implemented by introducing signalling where the serving radio network node 20 needs to give permission before the wireless communication device 10 starts transmitting the discovery signal. In other words, in some embodiments, the method further comprises sending S2, to its serving radio network node 20, a request for permission to transmit the discovery signal and receiving S3 an acknowledgement of the request. Such a request may e.g. be automatically sent when the wireless communication device 10 enters an aerial mode.

Figure 5:
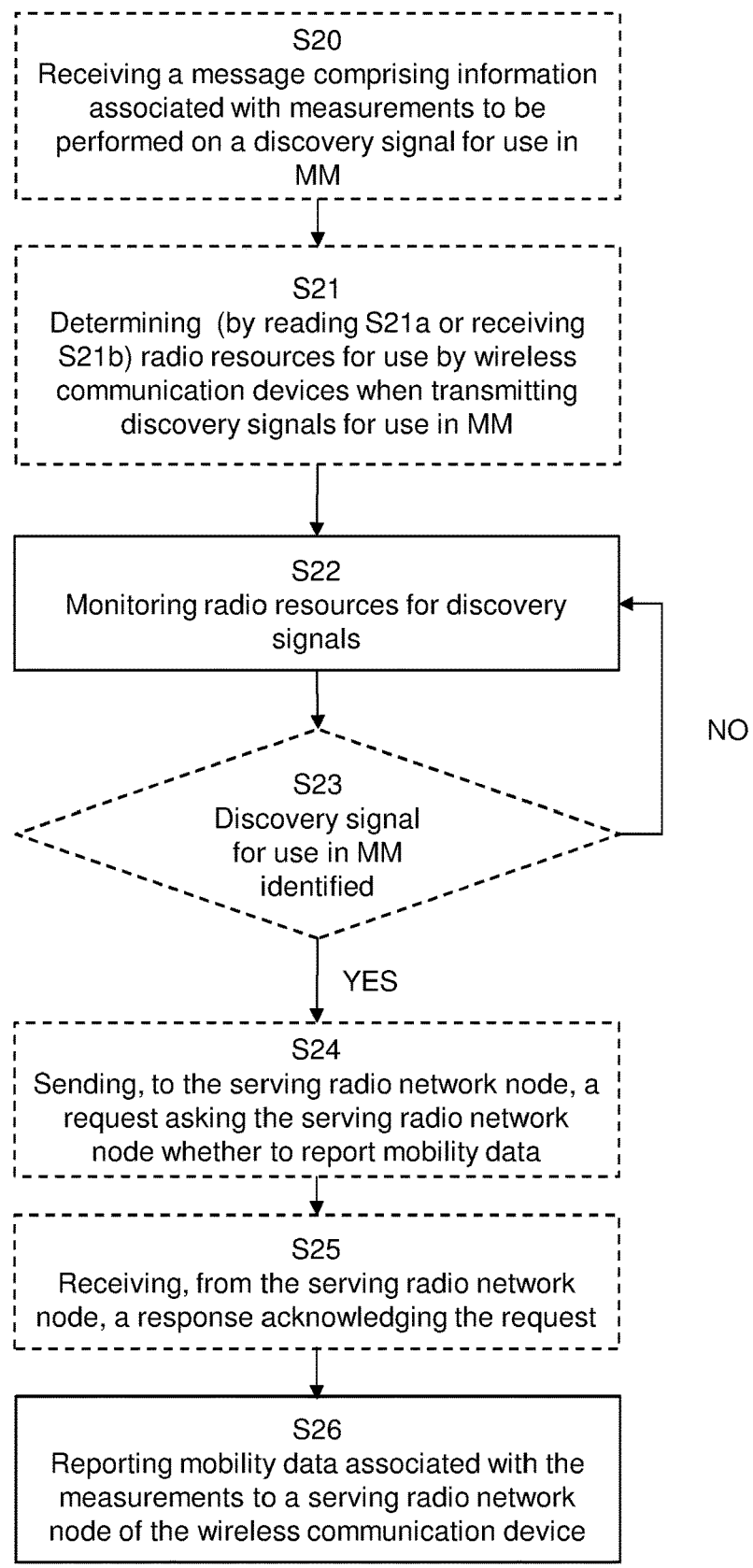
FIG. 5 illustrates the proposed method for use in a network node.

Embodiments related a radio network node 30 that is receiving the discovery signal transmitted by wireless communication device 10 according to the method presented in FIG. 4 will now follow. FIG. 5 illustrates a flow chart with method steps performed by radio network node 30 in a wireless communication network 1 comprising a plurality of network nodes 20, 30, 40 for supporting mobility management.

Note that the definition of the radio network nodes herein refers to the functions performed in relation to one particular wireless communication device 10. In reality, one physical radio network node would typically be serving radio network node 20 for one wireless communication device 10 and candidate radio network node 30, 40 for another wireless communication device. The role of one particular radio network node will also change over time as the wireless communication devices move in the network. Hence, in a real network a radio network node would typically perform both the method of FIG. 5 and FIG. 6 in parallel, but for different wireless communication devices.

The steps of the method may be defined in a computer program, comprising instructions which, when the program is executed by one or more processors causes the radio network node 30 to carry out the method. The steps of the method may also be defined in a computer-readable medium. The computer-readable medium comprises instructions that, when executed by a one or more processors, causes the radio network node 30 to carry out the method.

A discovery signal is an announcement message that is used to inform receiving nodes about the presence of the wireless communication device 10. The method in a radio network node 30 comprises monitoring S22 radio resources for discovery signals. The monitored radio resources are also used for transmission of signals for use by other functions than mobility management, e.g. they are also used for transmission of Device-to-Device, D2D, discovery signals or user plane communication. In some embodiments, the monitoring S22 also comprises monitoring the determined radio resources for other signals.

In some embodiments, the radio network node 30 will be informed in advance about discovery signals that it might receive. In other words, in some embodiments the method further comprises receiving S20 a message comprising information associated with a discovery signal transmitted by the wireless communication device 10. The information is e.g. or instruction to monitor a certain radio resource or rules for measurements to be performed on discovered discovery signals. Then the monitoring S22 is performed based on at least a part of the received information S20.

In some embodiments, the method comprises determining S21 resources that are used for transmission of discovery signals for use in mobility management and monitoring the determined resources. The determining may comprise reading S21a a predefined discovery signal configuration, which is e.g. configured at network setup or defined in network specifications. In some embodiments, the determining S21 comprises receiving S21b information defining the radio resources from a serving radio network node 20 of the wireless communication device 10, as discussed in connection with FIG. 3.

The method further comprises, upon identifying S23, a discovery signal comprising an indication that the discovery signal is for use in mobility management, reporting S26 mobility data associated with the discovery signal to one or more of the other radio network nodes. Thus, when a discovery signal for use in mobility management is identified, a report is sent to one or more of the other radio network nodes of the wireless communication network 1.

The identifying S23 typically comprises reading or interpreting the indication comprised in the discovery signal. The indication is e.g. an information element, a flag comprised in the discovery signal, and a pre-defined format if the discovery signal, see above.

As already mentioned, the discovery signal may further comprise an identifier of a serving radio network node 20 of the wireless communication device 10. In some embodiments the identifying S23, also comprises identifying a wireless communication device 10 that transmitted the discovery signal and/or a serving network node of the wireless communication device 10.

The mobility data comprises e.g. identity data defining wireless communication devices identified by the detected discovery signals or measurement data corresponding to the detected discovery signals that fulfil a predefined criteria. Thus, the radio network node 30 may perform measurements on the discovery signal and report the measurements. The measurements may be simple signal strength measurements. Alternatively, the report may comprise information that require analysis and/or decoding of the signal.

Sometimes it is desired to only report discovery signals when the channel between the radio network node 30 and the wireless communication device 10 is good, i.e. RSSI is above a certain threshold. Thus the radio network node 30 may use the discovery signal to estimate RSSI and then only report the reception of the discovery signal if signal strength is considered acceptable. In other words, in some embodiments, the mobility data comprises measurement data corresponding to the detected discovery signals that fulfil a predefined criteria. Such a solution would minimize signalling in the wireless communication network 1.

If there are many wireless communication devices in the wireless communication network 1 that start transmitting discovery signals it might be desirable to request rules for when and what to report back mobility data to the serving radio network node 20. In other words, in some embodiments, the method further comprises sending S24, to the serving radio network node 20 a request asking the serving radio network node 20 whether to report mobility data associated with the wireless communication device 10 and receiving S25, from the serving radio network node 30, a response acknowledging the request. Alternatively, the radio network nodes 30, 40 are configured with rules when to report in message S20.

In some embodiments the radio network node 30 may also ask some or all its neighbour radio network nodes (or similar) whether they are interested in receiving the report. In other words, in some embodiments the radio network node 30 sends the request to one or more of the radio network nodes in the wireless communication network 1.

Figure 6:
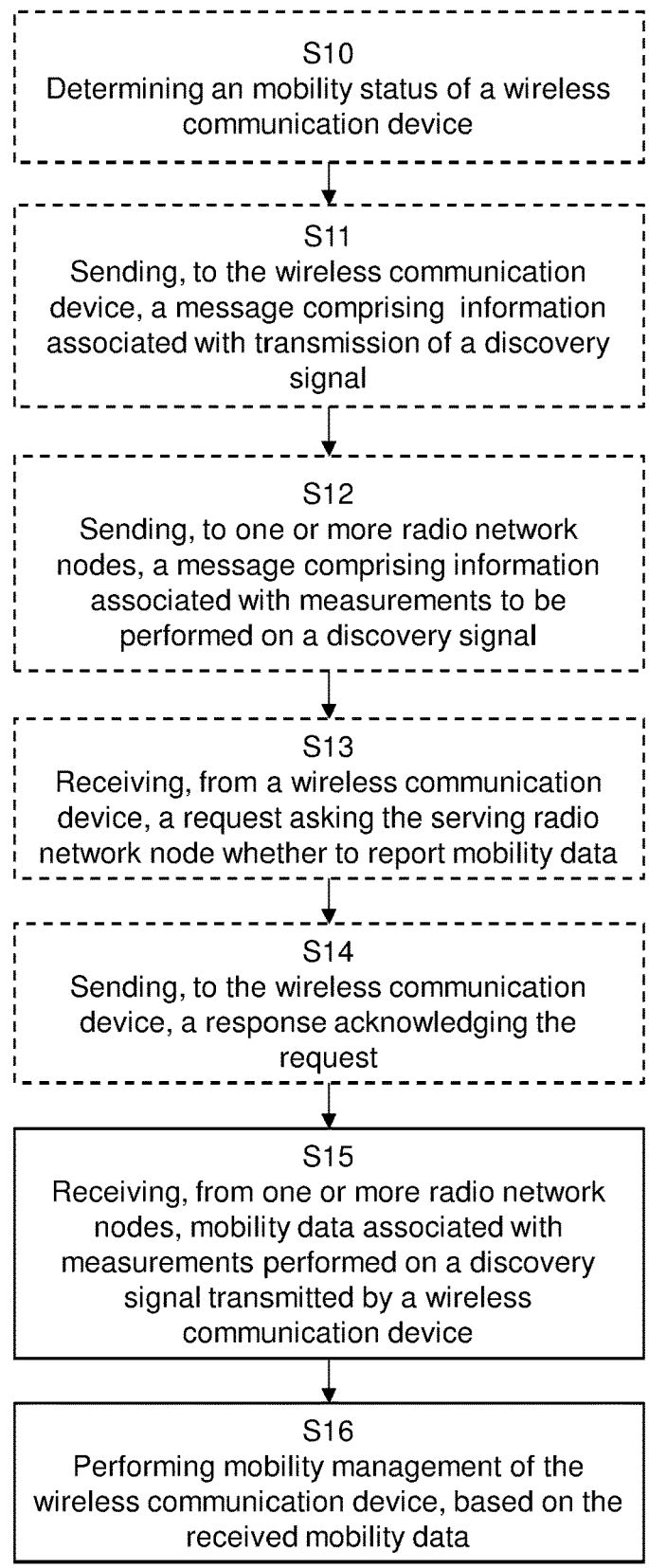
FIG. 6 illustrates the proposed method for use in a serving network node.

Embodiments related a serving radio network node 20 of the wireless communication device 10 will now follow. FIG. 6 illustrates a flow chart with method steps performed by a serving radio network node 20 of a wireless communication device 10 in a wireless communication network 1, wherein the wireless communication network 1 comprises a plurality of radio network nodes 20, 30, 40.

The steps of the method may be defined in a computer program, comprising instructions which, when the program is executed by one or more processors causes the serving radio network node 20 to carry out the method. The steps of the method may also be defined in a computer-readable medium. The computer-readable medium comprises instructions that, when executed by a one or more processors, causes the serving radio network node 20 to carry out the method.

The method comprises receiving S15, from one or more of the network nodes 30, 40, mobility data associated with measurements performed on a discovery signal transmitted by the wireless communication device 10.

The activation of the discovery signal is in some embodiments an explicit activation by network signalling (e.g. RRC control). For example the serving radio network node 20 triggers this transmission upon receiving an event report from the wireless communication device 10 in the Radio Resource Management, RRM, control. Thus, the information associated with the transmission of the discovery signal may comprise an instruction to the wireless communication device to transmit the discovery signal. In this scenario the transmission of the discovery signal is e.g. activated based on mobility status or certain radio channel conditions detected by the serving radio network node 20.

The transmission of the discovery signal may alternatively be triggered based on predefined trigger conditions, e.g. based on parameters relating to the wireless communication device 10. Thus, in some embodiments the information comprises one or more criteria to be used by the wireless communication device 10 when determining whether to transmit the discovery signal.

The discovery signal can be configured to be transmitted once, e.g. upon receiving the activation request by the network. It may also be configured to be transmitted periodically, with either a predefined or network configured periodicity.

In some embodiments the information associated with the transmission of the discovery signal defines a repetition period and/or radio resources to use when transmitting the discovery signal.

Stated differently, the serving network node 20 performs S16 mobility management of the wireless communication device 10 based on the received mobility data.

In some embodiments the mobility management comprises selecting a target radio network 30 node from one or more network nodes based on the received mobility data. In some embodiments the mobility management comprises handing over the wireless communication device 10 from the serving radio network node 20 to the selected target radio network node 30.

Alternatively, the mobility management comprises configuring (downlink) mobility measurements to be performed by the wireless communication device 10 based on the received mobility data.

The disclosure also relates to a wireless communication device 10 configured to implement the method for use in a communications device 10 (FIG. 4). The wireless communications device 10 may comprise the modules depicted in FIG. 7 for accessing the wireless communication network 1. Those skilled in the art will appreciate that the different modules described below may also be referred to as e.g. units or the like.

The wireless communications device 10 may comprise a transmitter 11a and a receiver 11b for wireless signals.

The wireless communications device 10 is configured to, e.g. by means of a first receiving module 120, receive, from the serving radio network node 20 of the wireless communication device 10, a message comprising information associated with the transmission of the discovery signal. The first receiving module 120 may be implemented by a processor 12 and/or the receiver 11b of the wireless communications device 10.

The wireless communications device 10 is further configured to, e.g. by means of a determining module 121, determine whether to transmit a discovery signal configured for use by one or more of the radio network nodes 20, 30, 40 in the wireless communication network 1 for mobility management of the wireless communication device. The determining module 121 may be implemented by the processor 12 of the wireless communications device 10.

The wireless communications device 10 may further be configured to, e.g. by means of a sending module 122, send, to its serving radio network node 20, a request for permission to transmit the discovery signal. The sending module 122 may be implemented by the processor 12 and/or the transmitter 11a of the wireless communications device 10.

The wireless communications device 10 may further be configured to, e.g. by means of a second receiving module 123, receive, receives an acknowledgement of the request for permission to transmit the discovery signal. The second receiving module 123 may be implemented by the processor 12 and/or the receiver 11b of the wireless communications device 10.

The wireless communications device 10 is further configured to, e.g. by means of a transmitting module 124, transmit the discovery signal, wherein the discovery signal comprises an identifier of the wireless communication device and an indication that the discovery signal is for use in mobility management. The transmitting module 124 may be implemented by the processor 12 and/or the transmitter 11a of the wireless communications device 10.

In general, the wireless communications device 10 may be configured to perform all aspects of the method for use in a wireless communication device 10 described in FIG. 4.

The disclosure also relates to a radio network node 30 configured to implement the method for use in a radio network node 30 (FIG. 5). The network node 30 may comprise the modules depicted in FIG. 8 for controlling access to the wireless communication network 1.

The radio network node 30 may comprise a transmitter 31a and a receiver 31b for wireless signals.

The radio network node 30 may be configured to, e.g. by means of a first receiving module 320 receive a message comprising information associated with a discovery signal transmitted by the wireless communication device 10. The first receiving module 320 may be implemented by a processor 32 and/or the receiver 31b of the network node 30.

The radio network node 30 may be configured to, e.g. by means of a determining module 321 determine resources that are used for transmission of discovery signals for use in mobility management. The determining module 321 may be implemented by the processor 32 of the network node 30.

The radio network node 30 is further configured to, e.g. by means of a monitoring module 322 monitor radio resources for discovery signals. The monitoring module 322 may be implemented by the processor 32 and/or the receiver 31b of the network node 30.

The radio network node 30 is further configured to e.g. by means of an identifying module 323 identify S23, a discovery signal comprising an indication that the discovery signal is for use in mobility management. The identifying module 323 may be implemented by the processor 32 of the network node 30.

The radio network node 30 may be configured to, e.g. by means of a sending module 324, send, to the serving radio network node 20 a request asking the serving radio network node 20 whether to report mobility data associated with the wireless communication device 10. The sending module 324 may be implemented by the processor 32 and/or the transmitter 31a of the network node 30.

The radio network node 30 may be configured to, e.g. by means of a second receiving module 325 receive, from the serving radio network node 30, a response acknowledging the request. The second receiving module 325 may be implemented by the processor 32 and/or the transmitter 31a of the network node 30.

The radio network node 30 may be configured to, e.g. by means of a reporting module 326 report mobility data associated with the discovery signal to one or more of the other radio network nodes. The reporting module 326 may be implemented by the processor 32 and/or the transmitter 31a of the network node 30.

In general, the radio network nodes 30 may be configured to perform all aspects of the method for use in a radio network nodes 30 described in FIG. 5.

The disclosure also relates to a serving radio network node 20 configured to implement the method for use in a serving radio network node 20 (FIG. 6). The serving radio network node 20 may comprise the modules depicted in FIG. 9 for controlling access to the wireless communication network 1.

The serving radio network node 20 may comprise a transmitter 21a and a receiver 21b for wireless signals.

The serving radio network node 20 may be configured to, e.g. by means of a determining module 220 determine a mobility status of the wireless communication device. The determining module 220 may be implemented by a processor 22 of the serving radio network node 20.

The radio network node 20 may be configured to, e.g. by means of a first sending module 221, send based on the mobility status, a message to the wireless communication device 10 comprising information associated with the transmission of the discovery signal.

The radio network node 20 may be configured to, e.g. by means of a second sending module 222, send, based on the mobility status, to one or more of the radio network nodes 30, a message comprising information associated with measurements to be performed by the radio network node on a discovery signal.

The first and the second sending modules 221, 222 may be implemented by a processor 22 and/or the transmitter 21a of the serving radio network node 20.

The radio network node 20 may be configured to, e.g. by means of a first receiving module 223, receive a message from the radio network node 30 a request asking the serving radio network node 20 whether it wants to receive mobility data associated with the wireless communication device 10. The first receiving module 223 may be implemented by a processor 22 and/or the receiver 21b of the serving radio network node 20.

The radio network node 20 may be configured to, e.g. by means of a third sending module 224, send, to the radio network node 30, a response acknowledging the request. The third sending module 224 may be implemented by a processor 22 and/or the transmitter 21a of the serving radio network node 20.

The radio network node 20 may be configured to, e.g. by means of a second receiving module 225, receive, from one or more of the network nodes 30, 40, mobility data associated with measurements performed on a discovery signal transmitted by the wireless communication device 10. The second receiving module 225 may be implemented by a processor 22 and/or the receiver 21b of the serving radio network node 20.

The radio network node 20 may be configured to, e.g. by means of a performing module 226, perform mobility management of the wireless communication device 10 based on the received mobility data. The performing module 220 may be implemented by a processor 22 of the serving radio network node 20.

In general, the serving radio network node 20 may be configured to perform all aspects of the method for use in a serving radio network node 20 described in FIG. 6.

Some embodiments herein may also be described as a system comprising the wireless communications device 10, the serving radio network node 20 and the radio network node 30.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, or one or more of the blocks may be skipped, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Figure 7:
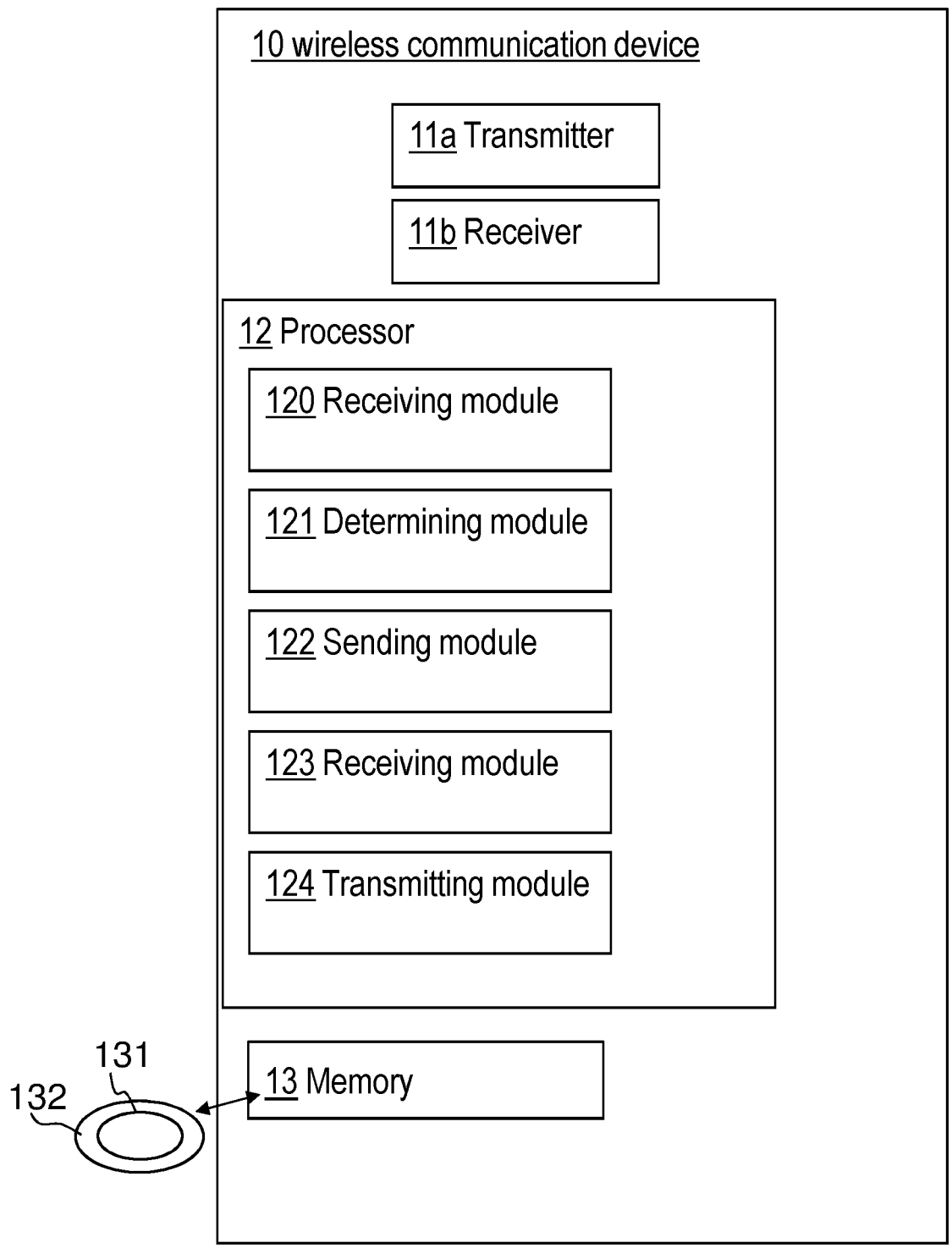
FIG. 7 illustrates an example wireless communication device.
Figure 8:
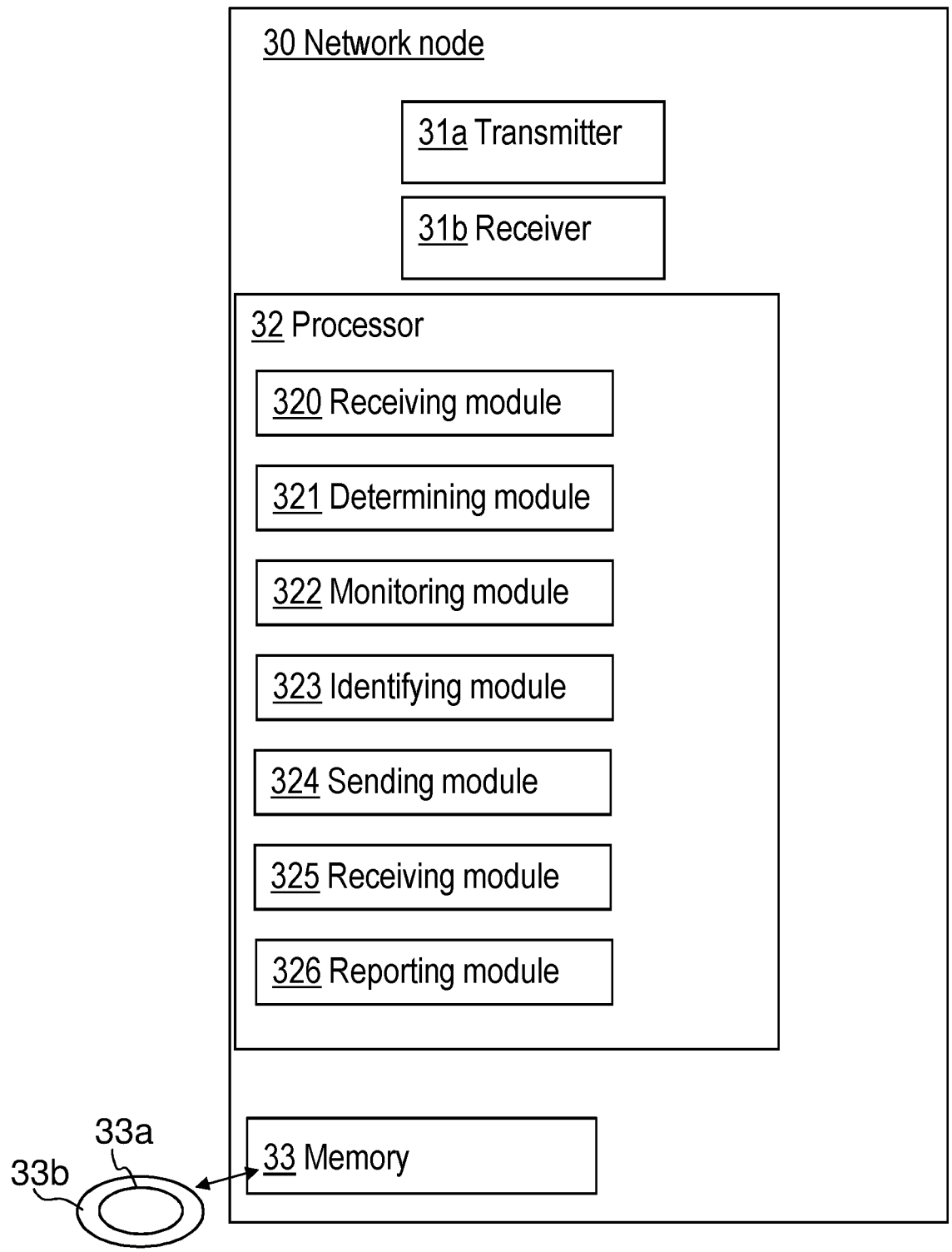
FIG. 8 illustrates an example network node.
Figure 9:
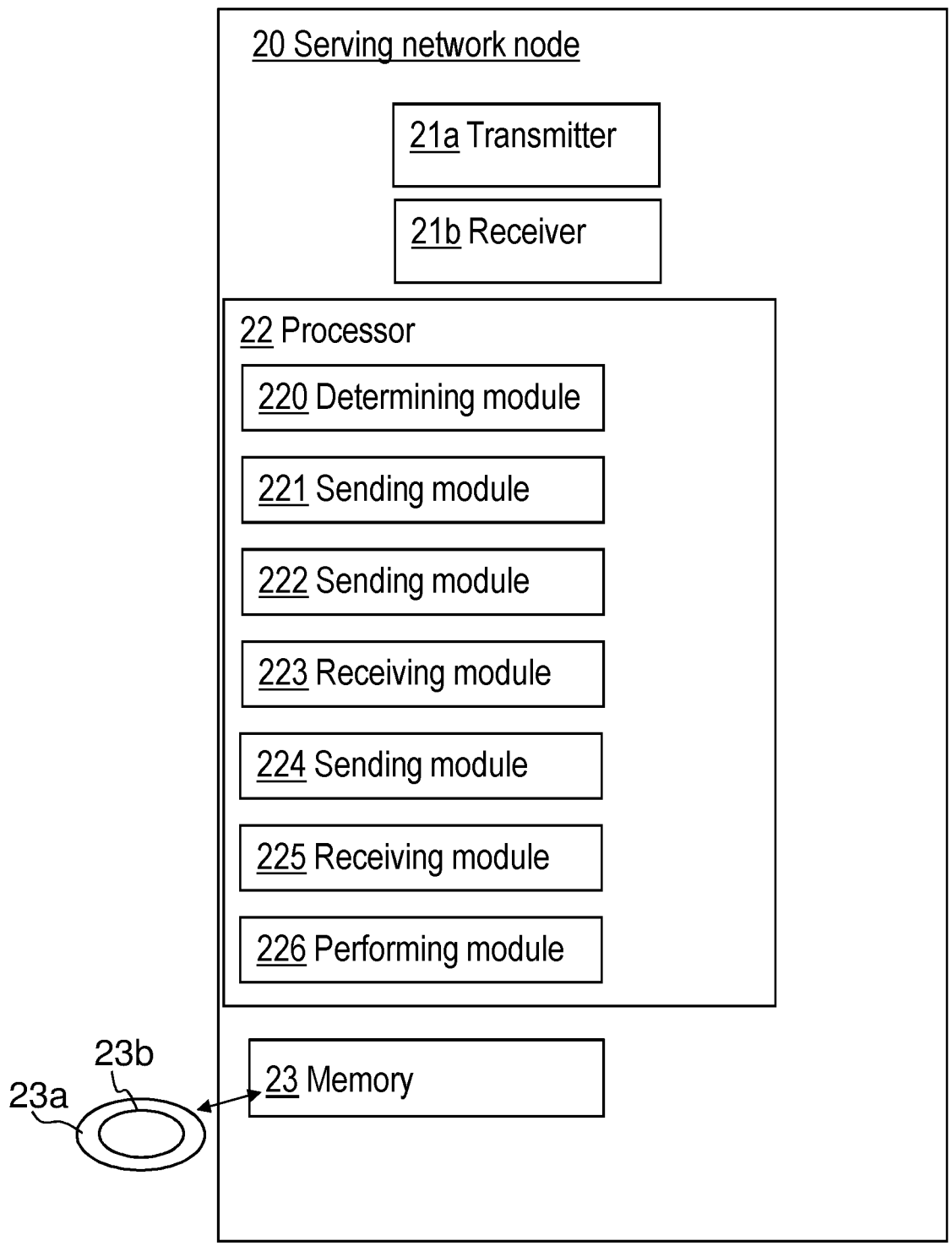
FIG. 9 illustrates an example serving network node.

The embodiments herein may be implemented through one or more processors, such as the processor 12 in the wireless communications device 10 depicted in FIG. 7, and the processor 22, 32 in the network nodes 20,30 depicted in FIGS. 8, 9 together with computer program code for performing the functions and actions of the embodiments herein. The program code mentioned above may also be provided as a computer program product 131, 231, 331, for instance in the form of a data carrier 132, 232, 332 carrying computer program code for performing the embodiments herein when being loaded into the network node 20, 30 and the wireless communications device 10.

One such carrier may be in the form of a CD ROM disc. It is however feasible with other data carriers such as a memory stick. The computer program code may furthermore be provided as pure program code on a server and downloaded via a fixed or wireless communication link to the network node 20, 30 and the wireless communications device 10.

Thus, the methods according to the embodiments described herein for the network node 20, 30 and the wireless communications device 10 may be implemented by means of a computer program product, comprising instructions, i.e., software code portions, which, when executed on at least one processor, cause the at least one processor to carry out the actions described herein, as performed by the network node 20, 30 and the wireless communications device 10. The computer program product may be stored on a computer-readable storage medium. The computer-readable storage medium, having stored there on the computer program, may comprise the instructions which, when executed on at least one processor, cause the at least one processor to carry out the actions described herein, as performed by the network node 20, 30 and the wireless communications device 10. In some embodiments, the computer-readable storage medium may be a non-transitory computer-readable storage medium.

The wireless communications device 10 and the network node 20, 30 may further each comprise a memory 13, 23, 33 comprising one or more memory units. The memory 13, 23, 33 is arranged to be used to store obtained information, such as predetermined rules and criteria for activating the discovery signal, and to perform the methods herein when being executed in the network node 20, 30, and the wireless communications device 10.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method, for use in a wireless communication device, for supporting mobility management of the wireless communication device in a wireless communication network comprising a plurality of radio network nodes, wherein one of the plurality of radio network nodes is a serving radio network node of the wireless communication device, the method comprising:
    receiving, from the serving radio network node, a message including information associated with discovery signal transmission;
    determining, based on the information, whether to transmit a discovery signal configured to support uplink-based mobility management of the wireless communication device by the wireless communication network, wherein the discovery signal is a sidelink communication signal; and
    upon the determining being positive,
    transmitting the discovery signal from the wireless communication device to one or more radio network nodes of the plurality of radio network nodes, wherein the discovery signal includes an identifier of the wireless communication device and an indication that the discovery signal is for supporting uplink-based mobility management of the wireless communication device based on measurements of the discovery signal by the one or more radio network nodes.

2. The method according to claim 1, wherein the indication comprises at least one of: an information element, a flag comprised in the discovery signal, and a pre-defined format of the discovery signal.

3. The method according to claim 1, wherein the discovery signal further comprises an identifier of the serving radio network node of the wireless communication device.

4. The method according to claim 1, wherein the discovery signal is transmitted on radio resources that are also used for transmission of signals for use by functions other than mobility management.

5. The method according to claim 1, wherein the discovery signal is transmitted on radio resources that are also is used by the wireless communication device for transmission of device to device, D2D, discovery signals and/or user plane data.

6. The method according to claim 1, wherein the information associated with the transmission of the discovery signal comprises at least one of:
    an instruction to the wireless communication device to transmit the discovery signal;
    one or more criteria to be used by the wireless communication device when determining whether to transmit the discovery signal; and
    information defining a repetition period and/or radio resources to use when transmitting the discovery signal.

7. The method according to claim 1, wherein the determining comprises evaluating one or more criteria taking as input at least one of:
    the number of radio network nodes being candidate target radio network nodes of the wireless communication device;
    a speed of the wireless communication device; and
    an aerial status of the wireless communication device.

8. A method, for use by a radio network node in a wireless communication network comprising a plurality of radio network nodes, for supporting uplink-based mobility management, the method comprising:
    monitoring radio resources for discovery signals, wherein the discovery signals are device-to-device (D2D) discovery signals; and
    upon identifying a discovery signal, transmitted by a wireless communication device to one or more radio network nodes of the plurality of radio network nodes, having an indication that the discovery signal is for supporting uplink-based mobility management, wherein the discovery signal is a D2D discovery signal,
    reporting mobility data associated with the discovery signal to one or more other radio network nodes of the plurality of radio network nodes, wherein the mobility data is based on measurements of the discovery signal.

9. The method according to claim 8, wherein the indication comprises at least one of: an information element, a flag comprised in the discovery signal, and a pre-defined format if the discovery signal.

10. The method according to claim 8, wherein the discovery signal further comprises an identifier of a serving radio network node of the wireless communication device.

11. The method according to claim 8, wherein the monitored radio resources are also used for transmission of signals for use by other functions than mobility management.

12. The method according to claim 8, wherein the monitored radio resources are also used for transmission of Device-to-Device, D2D, discovery signals and/or user plan data, and wherein the monitoring comprises monitoring the determined radio resources for other signals.

13. The method according to claim 8, further comprising:
    receiving a message comprising information associated with a discovery signal transmitted by the wireless communication device; and
    wherein the monitoring is performed based on at least a part of the received information.

14. The method according to claim 8, wherein the mobility data comprises at least one of:
identity data defining wireless communication devices identified by the detected discovery signals,
measurement data corresponding to the detected discovery signals; and
measurement data corresponding to the detected discovery signals that fulfil a predefined criteria.

15. The method according to claim 13, wherein the method further comprises:
determining resources that are used for transmission of discovery signals for use in mobility management.

16. The method according to claim 13, wherein the determining comprises at least one of:
reading a predefined discovery signal configuration, and
receiving information defining the radio resources from a serving radio network node of the wireless communication device.

17. The method according to claim 13, the method further comprising:
sending, to the serving radio network node a request asking the serving radio network node whether to report mobility data associated with the wireless communication device and
receiving, from the serving radio network node, a response acknowledging the request.

18. The method according to claim 13, wherein the wireless communication network comprises a plurality of radio network nodes, the method further comprising:
sending, to one or more of the radio network nodes a request asking the whether to report mobility data associated with the wireless communication device.

19. A method, for use by a serving radio network node of a wireless communication device in a wireless communication network, wherein the wireless communication network comprises a plurality of radio network nodes, for managing mobility of the wireless communication device in the wireless communication network, the method comprising:
receiving, from one or more other network nodes of the plurality of network nodes, mobility data associated with measurements performed on a discovery signal transmitted by the wireless communication device to the one or more other network nodes for supporting uplink-based mobility management, wherein the discovery signal is a device-to-device (D2D) discovery signal and includes an indication that the discovery signal is for supporting uplink-based mobility management; and
performing mobility management of the wireless communication device based on the received mobility data.

* * * * *